United States Patent
Fodor et al.

(10) Patent No.: US 11,317,294 B2
(45) Date of Patent: Apr. 26, 2022

(54) RECIPIENT USAGE INDICATION FOR CARRIER FREQUENCY

(71) Applicant: Telefonaktiebolaget LM Ericsson (publ), Stockholm (SE)

(72) Inventors: Gabor Fodor, Hässelby (SE); Osama Al-Saadeh, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 771 days.

(21) Appl. No.: 15/516,269

(22) PCT Filed: Mar. 3, 2017

(86) PCT No.: PCT/EP2017/055061
§ 371 (c)(1),
(2) Date: Mar. 31, 2017

(87) PCT Pub. No.: WO2018/157944
PCT Pub. Date: Sep. 7, 2018

(65) Prior Publication Data
US 2018/0255464 A1    Sep. 6, 2018

(51) Int. Cl.
*H04W 16/10* (2009.01)
*H04W 72/04* (2009.01)
*H04L 5/00* (2006.01)
*H04W 74/08* (2009.01)

(52) U.S. Cl.
CPC ........... *H04W 16/10* (2013.01); *H04L 5/0098* (2013.01); *H04W 72/0453* (2013.01); *H04W 74/08* (2013.01); *H04L 5/001* (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

2013/0040698 A1 * 2/2013 Nakamura ............ H04W 88/06
455/552.1
2015/0288532 A1 * 10/2015 Veyseh ................. H04L 12/283
370/310
(Continued)

FOREIGN PATENT DOCUMENTS

NL  WO 2006/000955 A1 *  6/2005  ............ H04L 12/28
WO     2006 000955 A1     1/2006
WO  WO-2006000955 A1 *  1/2006  ............ H04L 5/003

OTHER PUBLICATIONS

IEEE Transactions on Wireless communications, vol. 14, No. 7., Jul. 2015.*
(Continued)

*Primary Examiner* — Peter G Solinsky
*Assistant Examiner* — Sanjay K Dewan
(74) *Attorney, Agent, or Firm* — Baker Botts, LLP

(57) ABSTRACT

A radio device (100) receives a radio transmission on a carrier frequency. While receiving the radio transmission, the radio device (100) transmits an indication that the carrier frequency is in use by the radio transmission to the radio device (100). This indication may then be used by a further radio device (10, 11) for controlling a radio transmission to the radio device (100), e.g., by deciding whether, when, or how to use the carrier frequency for this radio transmission.

10 Claims, 7 Drawing Sheets

(58) Field of Classification Search
USPC .......................................................... 370/329
See application file for complete search history.

(56) References Cited

U.S. PATENT DOCUMENTS

2015/0296499 A1* 10/2015 Huang ................ H04W 72/048
370/329
2018/0019829 A1* 1/2018 Oyama .................. H04B 17/30

OTHER PUBLICATIONS

Choi, et al., Power-Controlled Medium Access Control Protocol for Full-Duplex WiFi Networks, IEEE Transactions on Wireless Communications, vol. 14,. No. 7, Jul. 2015.*
Power-Controlled Medium Access Control Protocol for Full-Duplex WiFi Networks by Choi Wooyeol et al.; IEEE Transactions on Wireless Communications, vol. 14, No. 7—Jul. 1, 2015.
PCT Notification of Transmittal of the International Search Report and the Written Opinion of the International Searching Authority, or the Declaration for International application No. PCT/EP2017/055061—dated Nov. 7, 2017.
Examination Report issued by Intellectual Property India for Application No. 201717010056—dated Sep. 18, 2019.
EPO Communication Pursuant to Article 94(3) EPC issued for Application No. 17 709 034.7-1215—dated Dec. 3, 2020.
Xiufeng Xie and Xinyu Zhang, Does Full-Duplex Double the Capacity of Wireless Networks?, IEEE INFOCOM 2014, IEEE Conference on Computer Communications—2014.

* cited by examiner

RECIPIENT USAGE INDICATION FOR CARRIER FREQUENCY

PRIORITY

This nonprovisional application is a U.S. National Stage Filing under 35 U.S.C. § 371 of International Patent Application Serial No. PCT/EP2017/055061 filed Mar. 3, 2017, and entitled "Recipient Usage Indication For Carrier Frequency."

TECHNICAL FIELD

The present invention relates to methods for controlling radio transmissions and to corresponding devices and systems.

BACKGROUND

In some wireless communication technologies multiple nodes may attempt to access a wireless medium simultaneously without the arbitration of a central entity. This may for example be the case when using carrier frequencies from an unlicensed spectrum. In such situations, a distributed medium access control (MAC) mechanism can help to coordinate access attempts and provide an arbitration mechanism to ensure that different radio devices can transmit on the wireless medium while maintaining a low probability of collisions. By way of example, a Carrier Sense Multiple Access (CSMA) scheme may be used for avoiding colliding usage of a wireless medium. In a CSMA scheme, a node will determine if the wireless medium is idle or currently occupied by transmission activity of another node. If the wireless medium is occupied, the node may defer its own transmission activity on the wireless medium until the node senses that the wireless medium is idle. The latter type of operation is also referred to as a Listen Before Talk (LBT) procedure. When the node decides to perform a transmission on the wireless medium, it can try to detect a collision during the ongoing transmission and decide to stop the ongoing transmission. In this way, a CSMA scheme can be used for managing shared usage of the wireless medium in a distributed manner.

However, in some scenarios the CSMA scheme or similar existing LBT mechanism might provide unsatisfactory results. For example, in a situation where a first UE (user equipment) and a second UE are located within a coverage area of a certain access node of the wireless communication network and share the same carrier frequency for communication with this access node, the first UE and the second UE may be located spaced apart from each other, so that the first UE might not be able to detect radio transmissions from the second UE and vice versa. For the CSMA scheme implemented by the first UE, radio transmissions from the second UE cannot be detected, i.e., the second UE is hidden from the perspective of the first UE. Similarly, for the CSMA scheme implemented by the second UE, radio transmissions from the first UE cannot be detected, i.e., the first UE is hidden from the perspective of the second UE. Accordingly, radio transmissions from the first UE and from the second UE can occur simultaneously and cause excessive interference to each other at the site of the access node, i.e., result in a collision. This problem is also referred to as "hidden node problem".

In another scenario, a first UE uses a carrier frequency for communication with a first access node and a second UE uses the same carrier frequency for communication with a second access node and the first UE and the second UE are located sufficiently close to each other, so that the first UE can detect radio transmissions from the second UE and vice versa. Accordingly, if the second UE needs to perform a radio transmission to the second access node while the first UE uses the carrier frequency for a radio transmission to the first access node, this may have the effect that the second UE senses this ongoing radio transmission on the carrier frequency and thus defers its own radio transmission, even though at the site of the second access node the interference level between the ongoing radio transmission to the first access node and the intended radio transmission to the second access node would be tolerable, e.g., because the first UE is too far away from the second access node. Accordingly, the second UE is exposed to radio transmissions which are sensed by the CSMA scheme implemented by the second UE, but would not cause a collision with the radio transmission intended by the second UE. With the existing CSMA scheme, this may result in inefficient utilization of the shared carrier frequency. This problem is also referred to as "exposed node problem".

Accordingly, there is a need for techniques which allow for efficient control of radio transmissions in scenarios where multiple radio devices can use the same carrier frequency for performing radio transmissions.

SUMMARY

According to an embodiment of the invention, a method of controlling radio transmission is provided. According to the method, a radio device receives a radio transmission on a carrier frequency. While receiving the radio transmission, the radio device transmits an indication that the carrier frequency is in use by the radio transmission to the radio device.

According to a further embodiment of the invention, a method of controlling radio transmission is provided. According to the method, a radio device detects a need to use a carrier frequency for performing a radio transmission to a further radio device. Further, the radio device receives, from the further radio device, an indication whether the carrier frequency is in use by another radio transmission to the further radio device. Depending on the indication, the radio device controls the radio transmission to the further radio device.

According to a further embodiment of the invention, a radio device is provided. The radio device is configured to receive a radio transmission on a carrier frequency. Further, the radio device is configured to, while receiving the radio transmission, transmit an indication that the carrier frequency is in use by a radio transmission to the radio device.

According to a further embodiment of the invention, a radio device is provided. The radio device is configured to detect a need to use a carrier frequency to perform a radio transmission to a further radio device. Further, the radio device is configured to receive, from the further radio device, an indication whether the carrier frequency is in use by another radio transmission to the further radio device. Further, the radio device is configured to control the radio transmission to the further radio device depending on the indication.

According to a further embodiment of the invention, a system is provided. The system comprises a first radio device and at least one second radio device The first radio device is configured to receive a radio transmission on a carrier frequency and, while receiving the radio transmission, transmit an indication that the carrier frequency is in use by the radio transmission to the radio device. The at least one second radio device is configured to receive the indication from the first radio device and control performing of a radio transmission to the first radio device depending on the received indication.

According to a further embodiment of the invention, a computer program or computer program product is provided, e.g., in the form of a non-transitory storage medium, which comprises program code to be executed by at least one processor of a radio device. Execution of the program code causes the radio device to receive a radio transmission on a carrier frequency. Further, execution of the program code causes the radio device to, while receiving the radio transmission, transmit an indication that the carrier frequency is in use by a radio transmission to the radio device.

According to a further embodiment of the invention, a computer program or computer program product is provided, e.g., in the form of a non-transitory storage medium, which comprises program code to be executed by at least one processor of a radio device. Execution of the program code causes the radio device to detect a need to use a carrier frequency to perform a radio transmission to a further radio device. Further, execution of the program code causes the radio device to receive, from the further radio device, an indication whether the carrier frequency is in use by another radio transmission to the further radio device. Further, execution of the program code causes the radio device to control the radio transmission to the further radio device depending on the indication.

Details of such embodiments and further embodiments will be apparent from the following detailed description of embodiments.

DETAILED DESCRIPTION OF EMBODIMENTS

Figure 1:
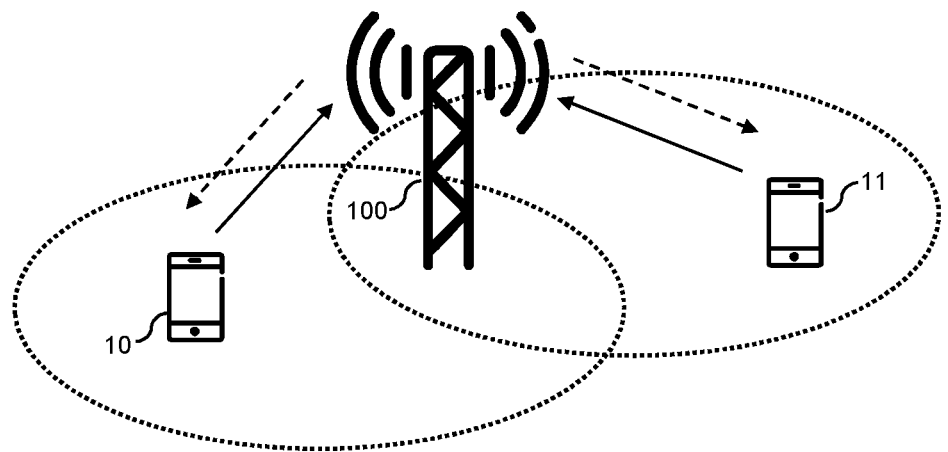
FIG. 1 schematically illustrates a hidden node scenario in which radio transmissions are controlled according to an embodiment of the invention.

In the following, concepts in accordance with exemplary embodiments of the invention will be explained in more detail and with reference to the accompanying drawings. The illustrated embodiments relate to control of radio transmissions in a wireless communication network. The wireless communication network is assumed to be based on a radio technology in which an LBT procedure is used for allowing shared usage of the same carrier frequency by multiple radio devices of which at least some support BFD (bidirectional full duplex) communication, also referred to as IBFD (In-Band Full Duplex) communication. The BFD communication involves that a radio device that can simultaneously transmit and receive on the same carrier frequency. This may be accomplished by using an SI (Self Interference) cancellation technique to cancel the signal transmitted by the radio device from the signal received by the radio device. The SI cancellation technique is used to avoid excessive high self-interference that a radio node transmitting and receiving radio signals on the same carrier frequency causes to itself.

In the illustrated examples, it is assumed that at least the access nodes of the wireless communication network support BFD communication, i.e., are equipped with a BFD capable transceiver. However, it is noted that the BFD communication could also be supported by at least some of the UEs connected to the wireless communication network. That is to say, also at least some of the UEs connected to the wireless communication network could be equipped with a BFD capable transceiver.

In the illustrated examples, the LBT procedure includes a carrier sense (CS) operation to assess whether the carrier frequency is in use. The radio technology may for example be based on using the LTE radio technology as specified by 3GPP in an unlicensed frequency spectrum, e.g., using the concept of licensed-assisted access (LAA) as discussed in 3GPP TR 36.889 V13.0.0 (2015-06). However, it is noted that the illustrated concepts may also be applied to other technologies, e.g., a next generation wireless communication technology, or a WLAN (Wireless Local Area Network) technology. In some scenarios, the concepts may be applied to BFD communication between a UE and an access node of the wireless communication network, e.g., a base station such as an eNB (evolved Node B) of the LTE technology. In some scenarios, the concepts may also be applied to BFD communication between two UEs, e.g., using a D2D (device-to-device) communication mode. That is to say, the two radio devices in BFD communication may correspond to a UE and an access node or to two UEs configured for D2D communication.

In the illustrated examples, it is assumed that a radio device needs to perform an LBT procedure before it can proceed to perform a radio transmission to another radio device. For example, the LBT procedure may be required because a carrier frequency which is used for the radio transmission is shared with other radio devices or even with other radio technologies. The LBT procedure is based on sensing the wireless medium, specifically the carrier frequency to be used, to assess whether the carrier frequency is currently in use by another radio transmission. Further, the LBT procedure is assisted by information from the other radio device, i.e., from the recipient of the intended radio transmission. Specifically, the other radio device sends an indication whether the carrier frequency is currently in use by a radio transmission to the other radio device. That is to say, the other radio device indicates whether it is currently engaged in receiving a radio transmission on the carrier frequency. Accordingly, the indication may also be referred to as a recipient usage indication for the carrier frequency. Utilizing a BFD capability of the other radio device, the other radio device can broadcast the indication on the carrier frequency, while it receives the other radio transmission. Accordingly, the indication can be conveyed in an efficient manner and is receivable also by radio devices which can utilize only one carrier frequency at a time, such a low-power UEs, MTC (Machine Type Communication) devices, or NB-IoT (Narrowband Internet of Things) devices.

Taking into account the additional information provided by the indication, the radio device may enhance the LBT procedure so that collisions can be avoided in a more efficient manner. Specifically, the LBT procedure may be enhanced to avoid collisions in a hidden node scenario and/or to optimize usage of a shared frequency in an exposed node scenario. This will be further explained below, by referring to exemplary scenarios where the same carrier frequency is used for uplink (UL) radio transmissions from a first UE and a second UE. However, it is noted that the illustrated procedures and functionalities could also be applied in other scenarios, e.g., involving D2D communication between two UEs, which means that the recipient of the radio transmission would be another UE, or downlink (DL) communication from an access node to a UE.

FIG. 1 schematically illustrates an exemplary hidden node scenario where a first UE 10 and a second UE 11 communicate with an access node 100 of the wireless communication network. UL radio transmissions from the UEs 10, 11 to the access node 100 may be performed on a first carrier frequency F1, subject to the condition that the transmitting UE 10, 11 performed an LBT procedure to assess usage of the carrier frequency. The first carrier frequency F1 may for example be from an unlicensed frequency spectrum. For example, the first carrier frequency could be used for LAA based usage of the LTE radio technology. In addition or as an alternative to using the first carrier frequency F1 for the UL radio transmissions, the UEs 10, 11 could also use other carrier frequencies, e.g., a second carrier frequency F2 which is different from the first carrier frequency. Also, the second carrier frequency F2 could be from an unlicensed frequency spectrum. In the scenario of FIG. 1, at least the access node 100 is assumed to support BFD communication, which means that while the access node 100 receives a radio transmission on a given carrier frequency, e.g., the first carrier frequency F1 or the second carrier frequency F2, it can at the same time also transmit on this carrier frequency. For the sake of simplicity, it will in the following be assumed that also the first UE 10 and the second UE 11 support BFD communication. Accordingly, while the UE 10, 11 receives a radio transmission on a given carrier frequency, e.g., the first carrier frequency F1 or the second carrier frequency F2, it can at the same time also transmit on this carrier frequency.

In FIG. 1, a range of UL radio transmissions from the first UE 10 and a range of UL radio transmissions from the second UE 11 are illustrated by dotted lines. As can be seen, the access node 100 is in an overlap region of the range of UL radio transmissions from the first UE 10 and the range of UL radio transmissions from the second UE 11. Accordingly, the access node 100 can receive UL radio transmissions from the first UE 10 and UL radio transmissions from the second UE 11. As further illustrated, the first UE 10 is outside the range of UL radio transmissions from the second UE 11. Similarly, the second UE 11 is outside the range of UL radio transmissions from the first UE 10. Accordingly, the first UE 10 will not be able to detect an UL radio transmission from the second UE 11 to the access node 100, and the second UE 11 will not be able to detect an UL radio transmission from the first UE 10 to the access node 100. Accordingly, from the perspective of a carrier sense operation performed by the first UE 10, the second UE 11 constitutes a hidden node, while from the perspective of a carrier sense operation performed by the second UE 11, the first UE 10 constitutes a hidden node. However, if an UL radio transmission from the second UE 11 to the access node 100 and an UL radio transmission from the first UE 10 to the access node 100 occur simultaneously on the same carrier frequency, e.g., on the first carrier frequency F1 or on the second carrier frequency F2, this may result in excessive mutual interference at the site of the access node 100, i.e., in a collision of the two UL radio transmissions.

Figure 2:
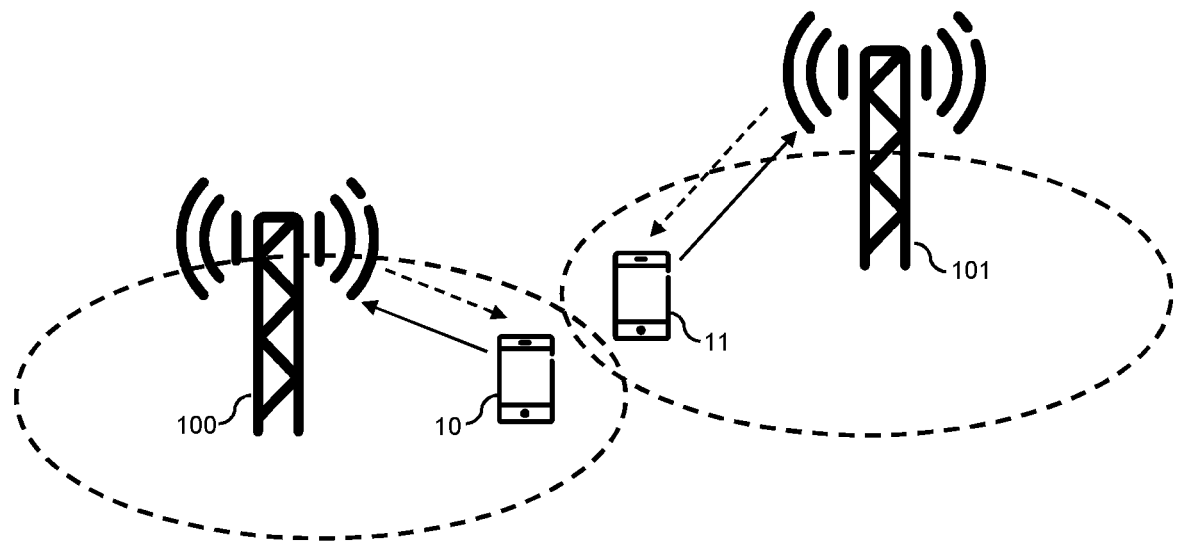
FIG. 2 schematically illustrates an exposed node scenario in which radio transmissions are controlled according to an embodiment of the invention.

FIG. 2 schematically illustrates an exemplary exposed node scenario where a first UE 10 communicates with a first access node 100 of the wireless communication network, and a second UE 11 communicates with a second access node 101 of the wireless communication network. UL radio transmissions from the UEs 10, 11 to the access nodes 100, 101 may be performed on a first carrier frequency F1, subject to the condition that the transmitting UE 10, 11 performed an LBT procedure to assess usage of the carrier frequency. Like in the scenario of FIG. 1, the first carrier frequency F1 may for example be from an unlicensed frequency spectrum. For example, the first carrier frequency could be used for LAA based usage of the LTE radio technology. In addition or as an alternative to using the first carrier frequency F1 for the UL radio transmissions, the UEs 10, 11 could also use other carrier frequencies, e.g., a second carrier frequency F2 which is different from the first carrier frequency. Also, the second carrier frequency F2 could be from an unlicensed frequency spectrum. In the scenario of FIG. 2, at least the access nodes 100, 101 are assumed to support BFD communication, which means that while the access node 100, 101 receives a radio transmission on a given carrier frequency, e.g., the first carrier frequency F1 or the second carrier frequency F2, it can at the same time also transmit on this carrier frequency. For the sake of simplicity, it will in the following be assumed that also the first UE 10 and the second UE 11 support BFD communication. Accordingly, while the UE 10, 11 receives a radio transmission on a given carrier frequency, e.g., the first carrier frequency F1 or the second carrier frequency F2, it can at the same time also transmit on this carrier frequency.

In FIG. 2, a coverage area of the first access node 100 and a coverage area of the second access node 101 are illustrated by dashed lines. The coverage area may represent a range in which the respective access node 100, 101 can receive UL radio transmissions from a UE, e.g., from the first UE 10 or from the second UE 11. As can be seen, the first UE 10 is located close to the second UE 11, so that the first UE 10 can detect UL radio transmissions from the second UE 11 and the second UE 11 can detect UL radio transmissions from the first UE 10. However, the UL radio transmissions from the first UE 10 will not have significant signal strength at the site of the second access node 101, and the UL radio transmissions from the second UE 11 will not have significant signal strength at the site of the first access node 100. Accordingly, from the perspective of a carrier sense operation performed by the first UE 10, the first UE 10 constitutes an exposed node with respect to UL radio transmissions performed by the second UE 11, while from the perspective of a carrier sense operation performed by the second UE 11, the second UE 11 constitutes an exposed node with respect to UL radio transmissions performed by the first UE 10. This may have the effect that a carrier sense operation performed by the first UE 10 indicates that a certain carrier frequency, e.g., the first carrier frequency F1 or the second carrier frequency F2, is in use by another radio transmission, even though it would actually be available for an UL radio transmission to the first access node 100, or that a carrier sense operation performed by the second UE 11 indicates that a certain carrier frequency, e.g., the first carrier frequency F1 or the second carrier frequency F2, is in use by another radio transmission, even though it would actually be available for an UL radio transmission to the second access node 101.

To assist the LBT procedures performed by the UEs 10, 11 before performing an UL radio transmission to the respective access node 100, 101 the access node 100, 101 sends a broadcast message to provide the above-mentioned recipient usage indication. In FIGS. 1 and 2, the broadcast message is illustrated by a dashed arrow. The broadcast message includes the recipient usage indication for each of the multiple available carrier frequencies, e.g., the carrier frequencies F1, F2. That is to say, the broadcast message indicates whether the carrier frequency is currently in use by an UL radio transmission to the access node 100, 101, i.e., whether the access node 100, 101 is currently receiving on the carrier frequency. Moreover, the broadcast message may also include additional information, such as an identity of the access node 100, 101, an identifier of the carrier frequency to which the indication refers, and information on one or more radio resources which, from the perspective of the access node 100, 101, are currently available for performing an UL radio transmission to the access node 100, e.g., by identifying one or more alternative carrier frequencies.

As mentioned above, the broadcast message conveying the recipient usage indication may be transmitted by using a BFD capability of the access node 100, 101. Accordingly, the access node 100, 101 can transmit the broadcast message on a certain carrier frequency, while at the same time the access node 100, 101 receives an UL radio transmission on this carrier frequency. In some scenarios, the access node 100, 101 could also transmit the broadcast message on multiple carrier frequencies, while at the same time the access node 100, 101 receives an UL radio transmission on one of these carrier frequencies. The access node 100, 101 may transmit the broadcast message in a repetitive manner, thereby enabling UEs to receive regular updates about the reception status of the access node 100, 101. For example, the access node 100, 101 could repeat the broadcast message in regular time intervals of 1 ms to 100 ms. Further, it is noted that the access node 100, 101 could also transmit the broadcast message while it is not receiving any UL radio transmission. In that case, the broadcast message could indicate that the considered carrier frequency or carrier frequencies are currently not used for an UL radio transmission to the access node 100, 101. Also in the latter case, the broadcast message could be repeated in regular time intervals. In view of power saving and efficient usage of radio resources, these time intervals may be longer than while the access node 100, 101 is receiving an UL radio transmission, e.g., 1 s or longer.

Figure 3:
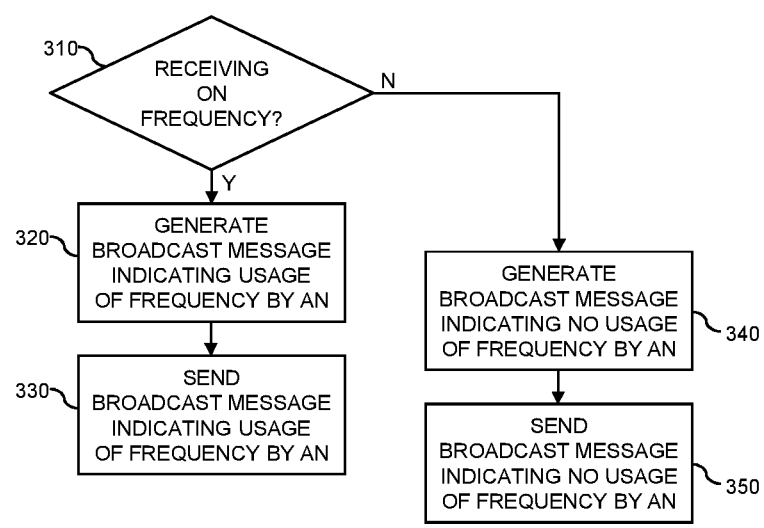
FIG. 3 schematically illustrates procedures as implemented by an access node in the scenario of FIG. 1 or 2.

The access node 100, 101 may send the broadcast message according to procedures as illustrated in FIG. 3. At step 310, the access node 100, 101 checks its current reception status, i.e., determines whether or not it is currently receiving on a certain carrier frequency. The check of step 310 may be triggered by a status change of the access node 100, 101, e.g., by starting of an UL radio transmission to the access node 100, 101 or by ending of an UL radio transmission to the access node 100, 101.

As indicated by branch "Y", if the access node 100, 101 is currently receiving on the carrier frequency, the access node 100, 101 proceeds to step 320. At step 320, the access node 100, 101 generates the broadcast message to indicate that the carrier frequency is currently in use by a radio transmission to the access node. At step 330, the access node 100, 101 sends the broadcast message. This is accomplished while still receiving the radio transmission on the carrier frequency. Using the BFD capability of the access node 100, 101, the access node 100, 101 can send the broadcast message on the carrier frequency, while it is receiving the ongoing radio transmission.

As indicated by branch "N", if the access node 100, 101 is currently not receiving on the carrier frequency, the access node 100, 101 proceeds to step 340. At step 340, the access node 100, 101 generates the broadcast message to indicate that the carrier frequency is currently not used by a radio transmission to the access node. At step 350, the access node 100, 101 sends the broadcast message.

The broadcast message from the access node 100, 101 is then received by the UE 10, 11. Based on the broadcast message, the UE 10, 11 can enhance the LBT procedure by also considering whether the access node 100, 101 to which it intends to send an UL radio transmission, is currently engaged in receiving an UL radio transmission on a certain carrier frequency. In this way, it can be avoided that the intended UL radio transmission collides with another UL radio transmission to the access node 100, 101 even if this other UL radio transmission is from a hidden node, such as in the hidden node scenario of FIG. 1. Further, it can be avoided that the UE 10, 11 refrains from using a certain carrier frequency for an intended UL radio transmission to the access node 100, 101 even though the access node 100, 101 is currently not receiving on this carrier frequency, such as in the exposed node scenario of FIG. 2.

Figure 4:
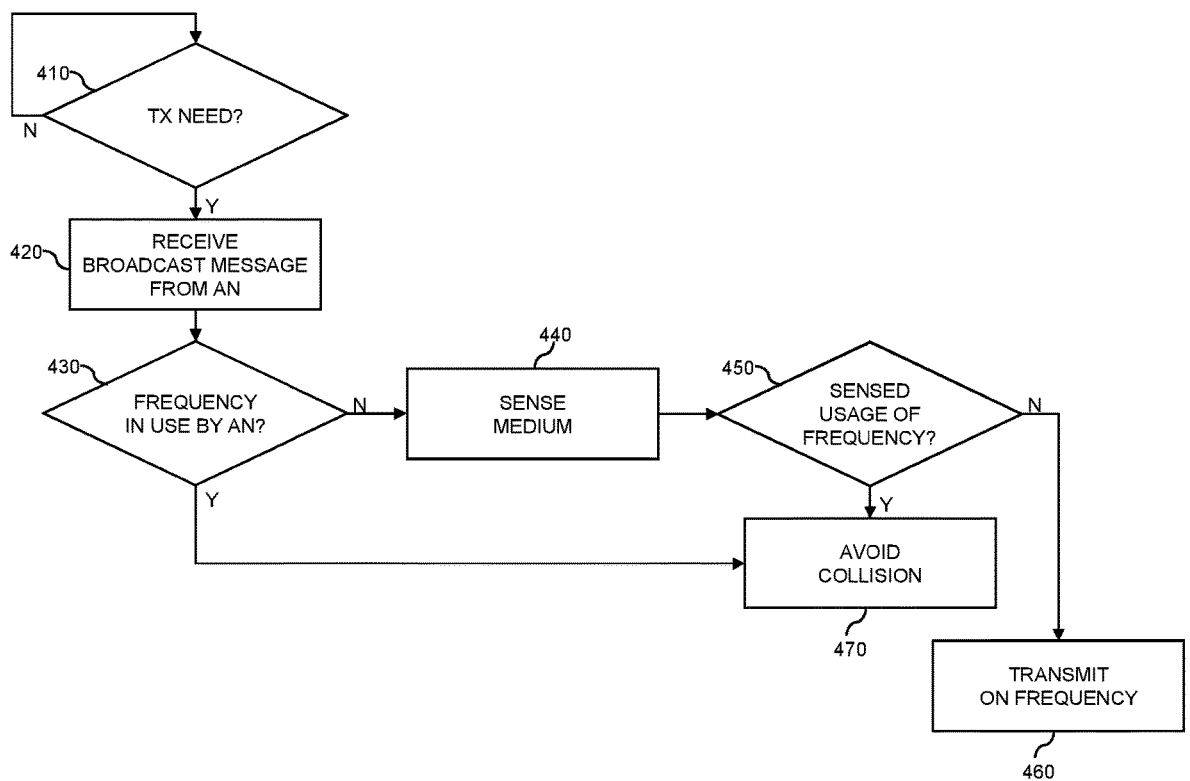
FIG. 4 schematically illustrates procedures as implemented by a UE in the scenario of FIG. 1 or 2.

Assisted by the broadcast message, the UE 10, 11 may control its UL radio transmissions according to procedures as illustrated in FIG. 4. At step 410, the UE 10, 11 checks if it needs to perform an UL radio transmission to the access node 100, 101. If this is not the case, the UE 10, 11 may repeat the check, as indicated by branch "N". If the UE 10, 11 needs to perform an UL radio transmission to the access node 100, 101, the UE 10, 11 continues with step 420 and to receive the broadcast message. Based on an identity of the access node 100, 101 as included in the broadcast message, the UE 10, 11 may also confirm that the received broadcast message is from the intended recipient of the UL radio transmission. Here, it is noted that in some scenarios the broadcast message could also be received before the UE 10, 11 detects the need to perform an UL radio transmission.

At step 430, the UE 10, 11 determines on the basis of the indication(s) in the broadcast message whether a certain carrier frequency is currently used by the access node 100, 101 to receive a radio transmission, e.g., an UL radio transmission from another UE. If this is not the case, the UE 10, 11 proceeds to step 440, as indicated by branch "N". At step 440, the UE 10, 11 performs a carrier sense operation to assess whether the carrier frequency is currently in use by another radio transmission. This may for example involve measuring the received signal power on the carrier frequency. At step 450, the UE 10, 11 then determines whether the carrier sense operation of step 440 indicates usage of the carrier frequency by another radio transmission. This may for example involve comparison of a received signal power on the carrier frequency, e.g., as measured at step 440, to a detection threshold.

If the check of step 450 indicates that there is no usage of the carrier frequency, the UE 10, 11 proceeds to step 460 and performs the UL radio transmission on the carrier frequency, as indicated by branch "N".

If the check of step 450 indicates that the carrier frequency is used by another radio transmission, the UE 10, 11 infers that it is an exposed node and proceeds to step 460 to initiate measures to avoid a collision of the UL radio transmission with the other radio transmission detected by steps 440 and 450. This may involve deferring the UL radio transmission. Further, this may involve performing the UL radio transmission on other radio resources, e.g., on an alternative carrier frequency. These other radio resources could for example be selected from available radio resources as indicated in the broadcast message. Further, the UE 10, 11 may also perform the UL radio transmission on the carrier frequency, however using one or more transmit parameters which are adapted to avoid excessive interference with the other radio transmission. For example, the UE 10, 11 may use measurements of received signal power to select a transmit power and/or modulation and coding scheme which avoid excessive interference of its UL radio transmission with the other radio transmission. For example, the UE 10, 11 could select a low transmit power, so that the other radio transmission is not disturbed, and a robust modulation and coding scheme, so that the UL radio transmission can be successfully received irrespective of the low transmit power.

If the check of step 430 indicates that the carrier frequency is currently used by the access node 100, 101 to receive a radio transmission, the UE 10,11 proceeds to step 460 and initiates measures to avoid a collision of the UL radio transmission with the other radio transmission currently received by the access node 100, 101. This may involve deferring the UL radio transmission. Further, this may involve performing the UL radio transmission on other radio resources, e.g., on an alternative carrier frequency. These other radio resources could for example be selected from available radio resources as indicated in the broadcast message. Further, the UE 10, 11 may also perform the UL radio transmission on the carrier frequency, however using one or more transmit parameters which are adapted to avoid excessive interference with the other radio transmission currently received by the access node 100, 101. For example, the UE 10, 11 may use measurements of received signal power to select a transmit power and/or modulation and coding scheme which avoid excessive interference of its UL radio transmission with the other radio transmission currently received by the access node 100, 101. For example, the UE 10, 11 could select a low transmit power, so that the other radio transmission is not disturbed, and a robust modulation and coding scheme, so that the UL radio transmission can be successfully received irrespective of the low transmit power.

Figure 5:
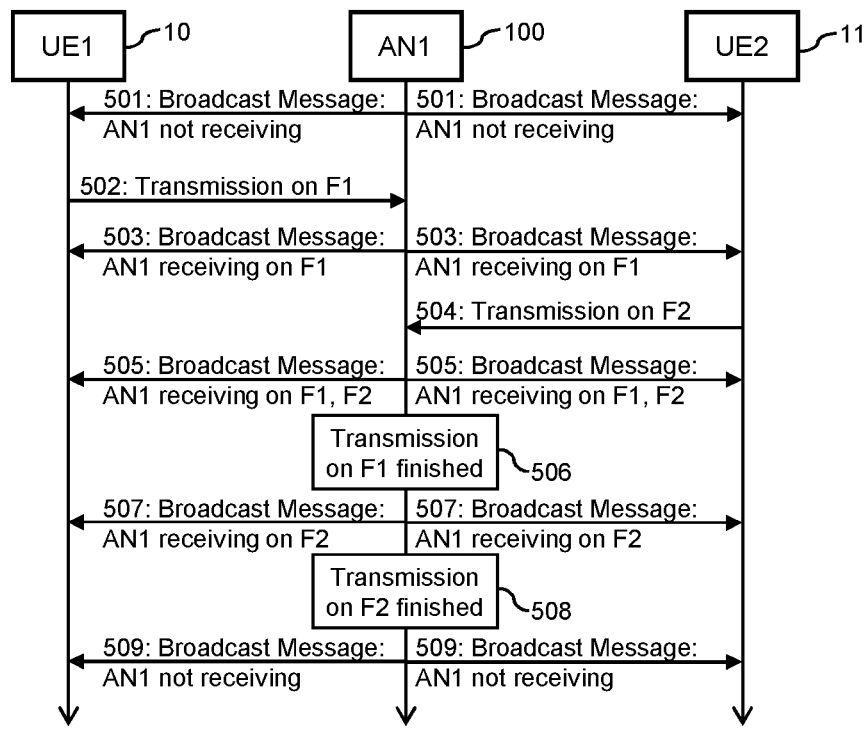
FIG. 5 illustrates an example of processes which may be performed in the hidden node scenario of FIG. 1.

FIG. 5 illustrates exemplary processes which may be performed in the hidden node scenario of FIG. 1. The processes of FIG. 5 involve the access node 100, designated by AN1, the first UE 10 designated by UE1, and the second UE 11 designated by UE2.

In the processes of FIG. 5, the access node 100 sends a broadcast message 501 on the carrier frequency F1. The broadcast message 501 is received by the first UE 10 and the second UE 11. The broadcast message 501 indicates that the access node 100 is currently not receiving on any carrier frequency. In addition, the broadcast message 501 includes an identifier of the access node 100. Based on this identifier, the UEs 10, 11 can distinguish the broadcast message 501 from other broadcast messages transmitted by other access nodes. In addition, the broadcast message 501 may also indicate radio resources which are available for performing an UL radio transmission to the access node 100. In the illustrated example, the broadcast message 501 could indicate that the first carrier frequency F1 and the second carrier frequency F2 are available for performing an UL radio transmission to the access node 100.

In the example of FIG. 5, it is assumed that the first UE 10 then needs to perform an UL radio transmission to the access node 100 and intends to use the first carrier frequency F1 for this purpose. According to the above-described procedure, the first UE 10 thus performs the carrier sense procedure on the first carrier frequency F1. In the illustrated example, it is assumed that there is no other radio transmission on the first carrier frequency F1, so that the first UE 10 assesses the first carrier frequency F1 as being free. As a result, the first UE 10 starts the UL radio transmission 502 to the access node 100 on the first carrier frequency F1.

The access node 100 starts receiving the UL radio transmission 502 and indicates its updated reception status by sending a further broadcast message 503. The broadcast message 503 is received by the first UE 10 and the second UE 11. The broadcast message 503 indicates that the access node 100 is currently receiving on the first carrier frequency F1. Further, also the broadcast message 503 includes an identifier of the access node 100 and may indicate radio resources which are available for performing an UL radio transmission to the access node 100. In the illustrated example, the broadcast message 503 could indicate that the second carrier frequency F2 is available for performing an UL radio transmission to the access node 100. Still further, the broadcast message 503 could indicate an expected duration of the ongoing UL radio transmission 502, e.g., in terms of an expected end time or in terms of a remaining duration.

In the example of FIG. 5, it is assumed that then the second UE 11 needs to perform an UL radio transmission to the access node 100. From the broadcast message 503 the second UE 11 determines that the first carrier frequency F1 is already in use, namely by the UL radio transmission 502. Accordingly, the example of FIG. 5 assumes that the second UE 11 decides to use the second carrier frequency F2 for its UL transmission to the access node 100. According to the above-described procedure, the second UE 11 then performs the carrier sense procedure on the second carrier frequency F2. In the illustrated example, it is assumed that there is no other radio transmission on the second carrier frequency F2, so that the second UE 11 assesses the second carrier frequency F2 as being free. As a result, the second UE 11 starts the UL radio transmission 504 to the access node 100 on the second carrier frequency F2.

The access node 100 starts receiving the UL radio transmission 504 and indicates its updated reception status by sending a further broadcast message 505. The broadcast message 505 is received by the first UE 10 and the second UE 11. The broadcast message 505 indicates that the access node 100 is currently receiving on the first carrier frequency F1 and on the second carrier frequency F2. Further, also the broadcast message 505 includes an identifier of the access node 100 and may indicate radio resources which are available for performing an UL radio transmission to the access node 100, e.g., other carrier frequencies than the first and second carrier frequencies F1, F2. Still further, the broadcast message 505 could indicate an expected duration of the ongoing UL radio transmissions 502, 504, e.g., in terms of an expected end time or in terms of a remaining duration.

Then the UL radio transmission 502 finishes. This is detected by the access node 100, as indicated by block 506, and the access node 100 indicates its updated reception status by sending a further broadcast message 507. The broadcast message 507 is received by the first UE 10 and the second UE 11. The broadcast message 507 indicates that the access node 100 is currently receiving on the second carrier frequency F2. Further, also the broadcast message 507 includes an identifier of the access node 100 and may indicate radio resources which are available for performing an UL radio transmission to the access node 100, e.g., the first carrier frequency F1. Still further, the broadcast message 507 could indicate an expected duration of the ongoing UL radio transmission 504, e.g., in terms of an expected end time or in terms of a remaining duration.

Then the UL radio transmission 504 finishes. This is detected by the access node 100, as indicated by block 508, and the access node 100 indicates its updated reception status by sending a further broadcast message 509. The broadcast message 509 is received by the first UE 10 and the second UE 11. The broadcast message 509 indicates that the access node 100 is currently not receiving on any carrier frequency. Further, also the broadcast message 509 includes an identifier of the access node 100 and may indicate radio resources which are available for performing an UL radio transmission to the access node 100, e.g., the first carrier frequency F1 and the second carrier frequency.

As can be seen, by using the additional information in the broadcast message 503, the second UE 11 avoids performing a colliding UL transmission on the first carrier frequency, even though the second UE 11 cannot detect the ongoing UL radio transmission 602 by a carrier sense operation.

Figure 6:
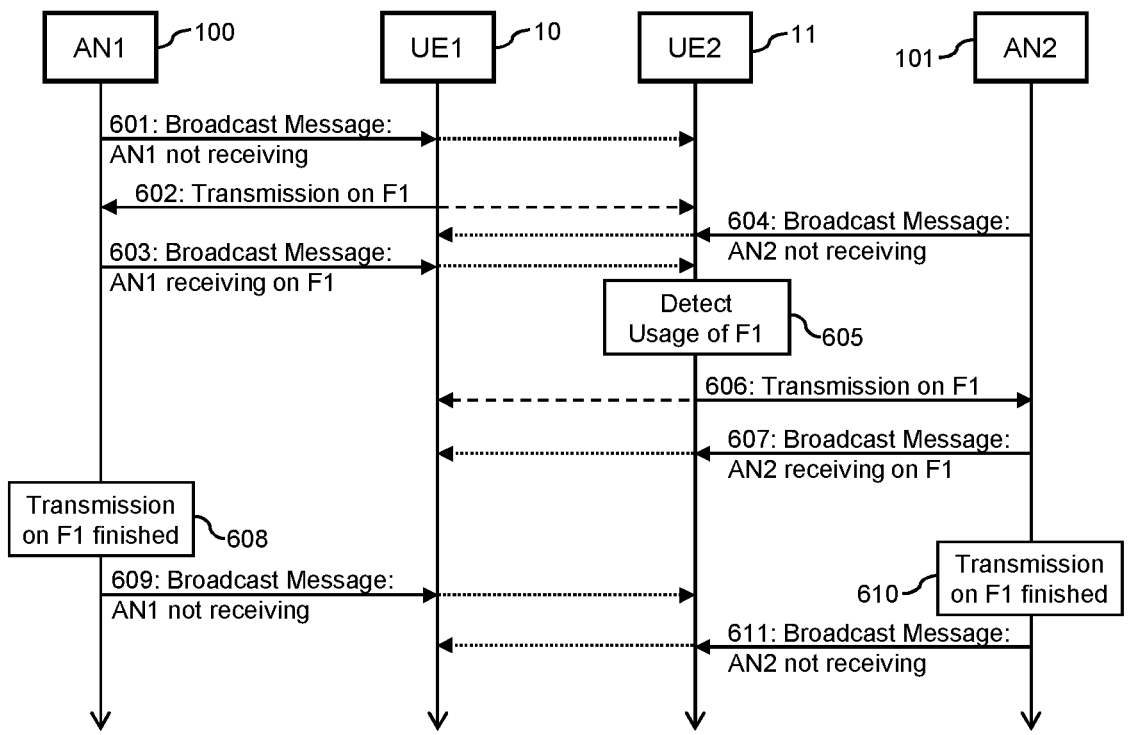
FIG. 6 illustrates an example of processes which may be performed in the exposed node scenario of FIG. 2.

FIG. 6 illustrates exemplary processes which may be performed in the exposed node scenario of FIG. 2. The processes of FIG. 6 involve the first access node 100, designated by AN1, the second access node, designated by AN2, the first UE 10, designated by UE1, and the second UE 11, designated by UE2.

In the processes of FIG. 6, the first access node 100 sends a broadcast message 601 on the carrier frequency F1. The broadcast message 601 is received by the first UE 10. As indicated by the dotted arrow, the broadcast message 601 may in some cases also be received by the second UE 11. The broadcast message 601 indicates that the first access node 100 is currently not receiving on any carrier frequency. In addition, the broadcast message 601 includes an identifier of the first access node 100. Based on this identifier, the UEs 10, 11 can distinguish the broadcast message 601 from other broadcast messages transmitted by other access nodes, e.g., by the second access node 101. In addition, the broadcast message 601 may also indicate radio resources which are available for performing an UL radio transmission to the first access node 100. In the illustrated example, the broadcast message 601 could indicate that the first carrier frequency F1 and the second carrier frequency F2 are available for performing an UL radio transmission to the first access node 100.

In the example of FIG. 6, it is assumed that the first UE 10 then needs to perform an UL radio transmission to the first access node 100 and intends to use the first carrier frequency F1 for this purpose. According to the above-described procedure, the first UE 10 thus performs the carrier sense procedure on the first carrier frequency F1. In the illustrated example, it is assumed that there is no other radio transmission on the first carrier frequency F1, so that the first UE 10 assesses the first carrier frequency F1 as being free. As a result, the first UE 10 starts the UL radio transmission 602 to the first access node 100 on the first carrier frequency F1. As illustrated by a dashed arrow, the UL radio transmission 602 is also detectable by the second UE 11.

The first access node 100 starts receiving the UL radio transmission 602 and indicates its updated reception status by sending a further broadcast message 603. The broadcast message 603 is received by the first UE 10. As indicated by the dotted arrow, the broadcast message 603 may in some cases also be received by the second UE 11. The broadcast message 603 indicates that the first access node 100 is currently receiving on the first carrier frequency F1. Further, also the broadcast message 603 includes an identifier of the first access node 100 and may indicate radio resources which are available for performing an UL radio transmission to the first access node 100. In the illustrated example, the broadcast message 603 could indicate that the second carrier frequency F2 is available for performing an UL radio transmission to the first access node 100. Still further, the broadcast message 603 could indicate an expected duration of the ongoing UL radio transmission 602, e.g., in terms of an expected end time or in terms of a remaining duration.

As further illustrated, also the second access node 101 sends a broadcast message 604 on the first carrier frequency F1. The broadcast message 604 is received by the second UE 11. As indicated by the dotted arrow, the broadcast message 604 may in some cases also be received by the first UE 11. The broadcast message 604 indicates that the second access node 100 is currently not receiving on any carrier frequency. In addition, the broadcast message 604 includes an identifier of the second access node 101. Based on this identifier, the UEs 10, 11 can distinguish the broadcast message 604 from other broadcast messages transmitted by other access nodes, e.g., by the first access node 100. In addition, the broadcast message 604 may also indicate radio resources which are available for performing an UL radio transmission to the second access node 101. In the illustrated example, the broadcast message 604 could indicate that the first carrier frequency F1 and the second carrier frequency F2 are available for performing an UL radio transmission to the second access node 101.

In the example of FIG. 6, it is assumed that then the second UE 11 needs to perform an UL radio transmission to the second access node 101 and intends to use the first carrier frequency F1 for this purpose. According to the above-described procedure, the second UE 11 thus performs the carrier sense procedure on the first carrier frequency F1. In the illustrated example, there second UE 11 will then detect the ongoing UL radio transmission 602 from the first UE 10, as indicated by block 605. However, from the broadcast message 604 the second UE 11 also knows that the second access node 101 is currently not receiving, which means that the second UE 11 is an exposed node and the radio transmission detected in the carrier sense procedure is to another recipient than the second access node 101. As a result, the second UE 11 decides to nonetheless use the first carrier frequency F1 and starts the UL radio transmission 606 to the second access node 101 on the first carrier frequency F1. To avoid excessive interference with the ongoing UL radio transmission 602 to the first access node 100, the second UE 11 may perform the UL radio transmission 606 with adapted transmit parameters, e.g., with a lower transmit power and optionally also a more robust modulation and coding scheme. As illustrated by a dashed arrow, the UL radio transmission 606 is also detectable by the first UE 10.

The second access node 101 starts receiving the UL radio transmission 606 and indicates its updated reception status by sending a further broadcast message 607. The broadcast message 607 is received by the second UE 11. As indicated by the dotted arrow, the broadcast message 607 may in some cases also be received by the first UE 10. The broadcast message 607 indicates that the second access node 101 is currently receiving on the first carrier frequency F1. Further, also the broadcast message 607 includes an identifier of the second access node 101 and may indicate radio resources which are available for performing an UL radio transmission to the second access node 101. In the illustrated example, the broadcast message 607 could indicate that the second carrier frequency F2 is available for performing an UL radio transmission to the second access node 101. Still further, the broadcast message 607 could indicate an expected duration of the ongoing UL radio transmission 606, e.g., in terms of an expected end time or in terms of a remaining duration.

Then the UL radio transmission 602 finishes. This is detected by the first access node 100, as indicated by block 608, and the first access node 100 indicates its updated reception status by sending a further broadcast message 609. The broadcast message 609 is received by the first UE 10. As indicated by the dotted arrow, the broadcast message 609 may in some cases also be received by the second UE 11. The broadcast message 609 indicates that the first access node 100 is currently not receiving on any carrier frequency. Further, also the broadcast message 609 includes an identifier of the first access node 100 and may indicate radio resources which are available for performing an UL radio transmission to the first access node 100, e.g., the first carrier frequency F1 and second carrier frequency.

Then the UL radio transmission 606 finishes. This is detected by the second access node 101, as indicated by block 610, and the second access node 101 indicates its updated reception status by sending a further broadcast message 611. The broadcast message 611 is received by the second UE 11. As indicated by the dotted arrow, the broadcast message 611 may in some cases also be received by the first UE 10. The broadcast message 611 indicates that the second access node 101 is currently not receiving on any carrier frequency. Further, also the broadcast message 611 includes an identifier of the second access node 101 and may indicate radio resources which are available for performing an UL radio transmission to the second access node 101, e.g., the first carrier frequency F1 and second carrier frequency.

As can be seen, by using the additional information in the broadcast message 604, the second UE 11 can use the first carrier frequency F1 irrespective of the carrier sense procedure indicating that the first carrier frequency is used by another radio transmission.

Figure 7:
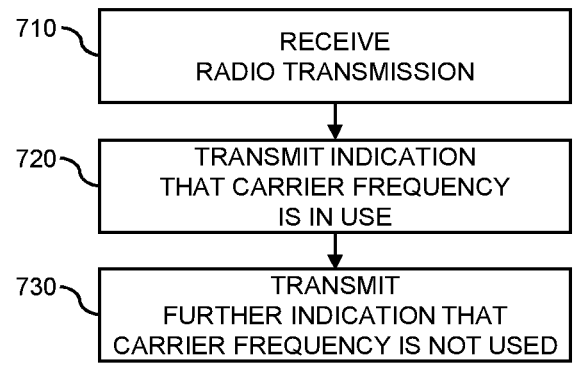
FIG. 7 shows a flowchart for schematically illustrating a method according to an embodiment of the invention.

FIG. 7 shows a flowchart for illustrating a method of controlling radio transmissions in a wireless communication network. The method of FIG. 7 may be utilized for implementing the illustrated concepts in a radio device which may act as a recipient of radio transmissions. For example, the radio device could be an access node of the wireless communication network, such as the above-mentioned access nodes 100, 101. However, the radio device could also correspond to a radio terminal, such as the above-mentioned UEs 10, 11. If a processor-based implementation of the radio device is used, the steps of the method may be performed and/or controlled by one or more processors of the radio device. In such a case the radio device may further comprise a memory storing program code for implementing the below described functionalities.

At step 710, the radio device receives a radio transmission on a carrier frequency. Examples of such radio transmission is the above-mentioned UL radio transmission 502, which is received by the access node 100, or the above-mentioned UL radio transmission 606, which is received by the access node 101. The carrier frequency may be from an unlicensed spectrum and usage of the carrier frequency may be LBT based. However, the carrier frequency could also be from a licensed spectrum and sharing of the carrier frequency by multiple radio devices could be LBT based.

At step 720, the radio device transmits an indication that the carrier frequency is in use by the radio transmission to the radio device. This is accomplished while the radio device receives the radio transmission. The radio device may transmit the indication in a broadcast radio transmission which is receivable by multiple other radio devices. In this way, the indication can be conveyed in a resource efficient manner. Further, the radio device may transmit the indication in a radio transmission on the carrier frequency, in particular in a broadcast radio transmission on the carrier frequency. For this purpose, the radio device may utilize a BFD capability enabling simultaneous reception and transmission on the same carrier frequency, e.g., as implemented by a BFD capable transceiver of the radio device. By sending the indication on the carrier frequency, the indication can be efficiently conveyed to other radio devices with limited capability to use other carrier frequencies, e.g., radio devices which can use only one carrier frequency at a time. Examples of such indications are the recipient usage indications in the above-mentioned broadcast message 503 or 607.

The indication may further indicate radio resources which are available for a radio transmission to the radio device, e.g., one or more alternative carrier frequencies and/or a time when the carrier frequency is expected to become available again. Further, the indication may indicate an identity of the radio device, e.g., in terms of a device identifier or cell identifier. Further, the indication may indicate the carrier frequency, e.g., in terms of a carrier index. In some scenarios, the carrier frequency could also be indicated in an implicit manner by transmitting the indication on the carrier frequency.

At step 730, the radio device may transmit a further indication. The further indication is transmitted while not receiving any radio transmission on the carrier frequency. The further indication indicates that the carrier frequency is not used by a radio transmission to the radio device. Examples of such further indication are the recipient usage indications in the above-mentioned broadcast message 501 or 604. Similar to the indication of step 720, the radio device may transmit the further indication in a broadcast radio transmission. Still further, also the further indication may indicate radio resources which are available for a radio transmission to the radio device, e.g., one or more alternative carrier frequencies and/or a time when the carrier frequency is expected to be available, and/or an identity of the radio device.

The indication and the further indication of steps 720 and 730 may then be used by other radio devices for controlling radio transmissions to the radio device, e.g., by deciding whether, when, or how to use the carrier frequency for such radio transmission.

Figure 8:
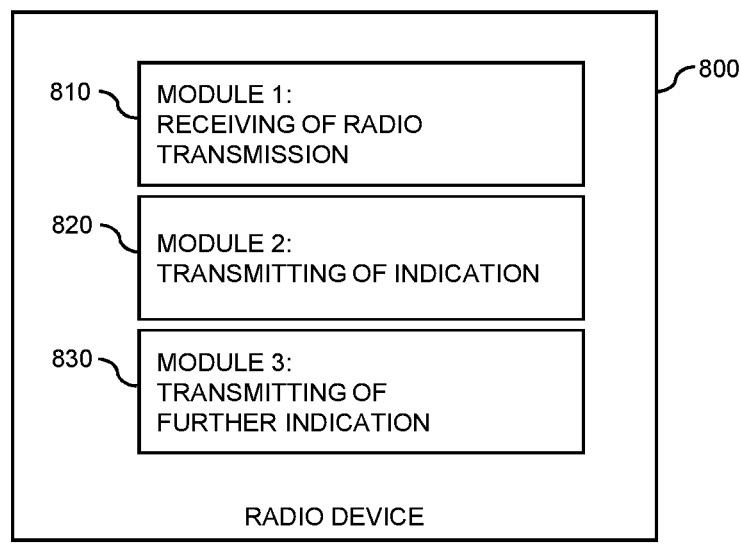
FIG. 8 shows a block diagram for illustrating functionalities of a radio device according to an embodiment of the invention.

FIG. 8 shows a block diagram for illustrating functionalities of a radio device 800 which operates according to the method of FIG. 7. As illustrated, the radio device 800 may be provided with a module 810 configured to receive a radio transmission on a carrier frequency, such as explained in connection with step 710. Further, the radio device 800 may be provided with a module 820 configured to transmit an indication that the carrier frequency is in use by a radio transmission to the radio device, such as explained in connection with step 720. Further, radio device 800 may be provided with a module 830 configured to transmit a further indication that the carrier frequency is not used for a radio transmission to the radio device, such as explained in connection with step 730.

It is noted that the radio device 800 may include further modules for implementing other functionalities, such as known functionalities of an access node or UE. Further, it is noted that the modules of the radio device 800 do not necessarily represent a hardware structure of the radio device 800, but may also correspond to functional elements, e.g., implemented by hardware, software, or a combination thereof.

Figure 9:
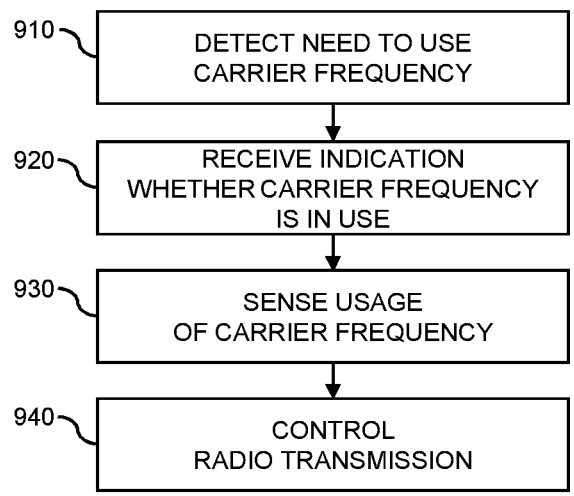
FIG. 9 shows a flowchart for schematically illustrating a further method according to an embodiment of the invention.

FIG. 9 shows a flowchart for illustrating a further method of controlling radio transmissions in a wireless communication network. The method of FIG. 9 may be utilized for implementing the illustrated concepts in a radio device which may act as a transmitter of radio transmissions. For example, the radio device could be a radio terminal transmitting to an access node of the wireless communication network, such as the above-mentioned UEs 10, 11 which transmit to the access nodes 100, 101. However, the radio device could also correspond to an access node transmitting to a radio terminal or a radio terminal transmitting to another radio terminal. If a processor-based implementation of the radio device is used, the steps of the method may be performed and/or controlled by one or more processors of the radio device. In such a case the radio device may further comprise a memory storing program code for implementing the below described functionalities.

At step 910, the radio device detects a need to use a carrier frequency for performing a radio transmission to a further radio device. As mentioned above, in some scenarios the other radio device may correspond to an access node of the wireless communication network. Examples of such scenarios are illustrated in FIGS. 1 and 2, where the UEs 10, 11 may need to perform UL radio transmissions to the access nodes 100, 101. The carrier frequency may be from an unlicensed spectrum and usage of the carrier frequency may be LBT based. However, the carrier frequency could also be from a licensed spectrum and sharing of the carrier frequency by multiple radio devices could be LBT based.

At step 920, the radio device receives an indication from the further radio device. The indication indicates whether the carrier frequency is in use by another radio transmission to the further radio device. The indication may indicate that the carrier frequency is in use by another radio transmission to the further radio device or the indication may indicate that the carrier frequency is not used by another radio transmission to the further radio device.

The radio device may receive the indication in a broadcast radio transmission which is also receivable by one or more other radio devices. In this way, the indication can be conveyed in a resource efficient manner. Further, the radio device may receive the indication in a radio transmission on the carrier frequency, in particular in a broadcast radio transmission on the carrier frequency. For this purpose, the radio device may utilize a BFD capability enabling simultaneous reception and transmission on the same carrier frequency, e.g., as implemented by a BFD capable transceiver of the radio device. By receiving the indication on the carrier frequency, the radio device is able to receive the indication even when it is not capable of using other carrier frequencies, e.g., due to limited device capabilities. For example, the radio device could be limited to use only one carrier frequency at a time. Examples of such indications are the recipient usage indications in the above-mentioned broadcast message 501, 503, 505, 507, 509, 601, 603, or 607.

At step 930, the radio device may further sense usage of the carrier frequency to assess whether the carrier frequency is in use by another radio transmission. This may involve that the radio device measures received signal power on the carrier frequency and compares the measured received signal power to a threshold. The sensing of the usage of the carrier frequency may be part of an LBT procedure performed before the radio device is allowed to perform a radio transmission on the carrier frequency.

At step 940, the radio device controls the radio transmission to the further radio device depending on the indication received at step 920, and optionally also depending on sensing of usage of the carrier frequency of step 930.

In some scenarios, the indication received at step 920 indicates that the carrier frequency is in use by another radio transmission to the further radio device. In this case, the indication may be transmitted while the further radio device receives the other radio transmission. Examples of such indications are the reception usage indications in the above-mentioned broadcast messages 503, 505, 507, 603, or 607. In this case, the radio device may defer the radio transmission to the further radio device, e.g., until the radio device receives a further indication which indicates that the carrier frequency is not used by another radio transmission to the further radio device. Further, the radio device may perform the radio transmission to the further radio device on another carrier frequency, e.g., a carrier frequency which was indicated to be available in the indication of step 920. Still further, the radio device may perform the radio transmission to the further radio device on the carrier frequency, using a transmit parameter configuration adapted to avoid interference with the other radio transmission to the further radio device. For example, such transmit parameter configuration could involve using a lower transmit power and/or more robust modulation and coding scheme.

In some scenarios, the indication received at step 920 indicates that the carrier frequency is not used by another radio transmission to the further radio device. Examples of such indications are the reception usage indications in the above-mentioned broadcast messages 501, 503, 507, 509, 601, 603, or 607. In this case, the radio device may additionally perform the sensing of the carrier frequency of step 930 to assess whether the carrier frequency is in use by another radio transmission. The radio device may then control the radio transmission to the further radio device also depending on whether this sensing of the carrier frequency indicates that the carrier frequency is in use by another radio transmission.

In some scenarios, the sensing of the carrier frequency indicates that the carrier frequency is in use by another radio transmission. In this case, the radio device may defer the radio transmission to the further radio device, e.g., until a further sensing of the carrier frequency indicates that carrier frequency is not used by another radio transmission. Further, the radio device may perform the radio transmission to the further radio device on another carrier frequency, e.g., a carrier frequency which was indicated to be available in the indication of step 920. Still further, the radio device may perform the radio transmission to the further radio device on the carrier frequency, using a transmit parameter configuration adapted to avoid interference with the other radio transmission to the further radio device. For example, such transmit parameter configuration could involve using a lower transmit power and/or more robust modulation and coding scheme. When deciding to use the latter option, the radio device may also consider that the indication of step 920 indicated that the carrier frequency is not used by another radio transmission to the further radio device, which facilitates avoiding interference with the other radio transmission indicated by the sensing of the carrier frequency.

In some scenarios, the sensing of the carrier frequency may indicate that the carrier frequency is not in use by another radio transmission. In such cases, the radio device may assume that the carrier frequency is free and perform the radio transmission to the further radio device on the carrier frequency. This may be accomplished without considering potential interference with other radio transmissions.

Figure 10:
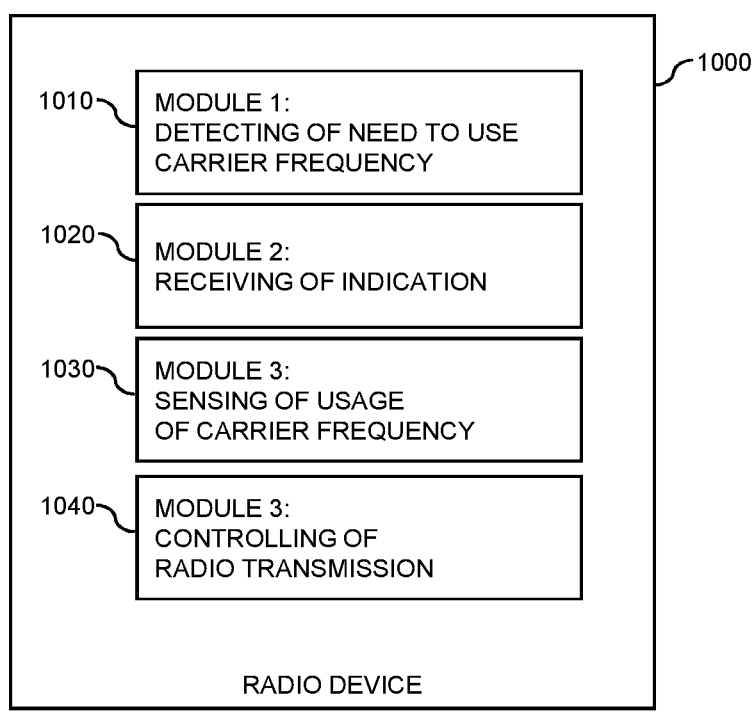
FIG. 10 shows a block diagram for illustrating functionalities of a radio device according to an embodiment of the invention.

FIG. 10 shows a block diagram for illustrating functionalities of a radio device 1000 which operates according to the method of FIG. 9. As illustrated, the radio device 1000 may be provided with a module 1010 configured to detect the need to perform a radio transmission to a further radio device on a certain carrier frequency, such as explained in connection with step 910. Further, the radio device 1000 may be provided with a module 1020 configured to receive an indication whether the carrier frequency is in use by a radio transmission to the further radio device, such as explained in connection with step 920. Further, radio device 1000 may be provided with a module 1030 configured to sense usage of the carrier frequency, such as explained in connection with step 930. Further, radio device 1000 may be provided with a module 1040 configured to control the radio transmission by the radio device, such as explained in connection with step 940.

It is noted that the radio device 1000 may include further modules for implementing other functionalities, such as known functionalities of a UE or access node. Further, it is noted that the modules of the radio device 1000 do not necessarily represent a hardware structure of the radio device 1000, but may also correspond to functional elements, e.g., implemented by hardware, software, or a combination thereof.

It is noted that the functionalities as explained in connection with FIGS. 7, 8, 9, and 10 may also be combined in a system which includes a first radio device operating according to the method of FIG. 7 and at least one second radio device operating according to the method of FIG. 9. In such system, the first radio device could send the indication, and optionally further indication, according to the method of FIG. 7, and the at least one second radio device could receive the indication(s) and control radio transmissions to the first radio device depending on the received indication (s), as explained in connection with FIG. 9. Specifically, the first radio device could be configured to receive a radio transmission on a carrier frequency and, while receiving the radio transmission, transmit an indication that the carrier frequency is in use by the radio transmission to the radio device, and the at least one second radio device could be configured to receive the indication from the first radio device and control performing of a radio transmission to the first radio device depending on the received indication. Further, while not receiving a radio transmission on the carrier frequency, the first radio device could be configured to transmit a further indication that the carrier frequency is not used by a radio transmission to the first radio device, and the at least one second radio device could be configured to receive this further indication from the first radio device and control performing of a radio transmission to the first radio device also depending on the received further indication.

Figure 11:
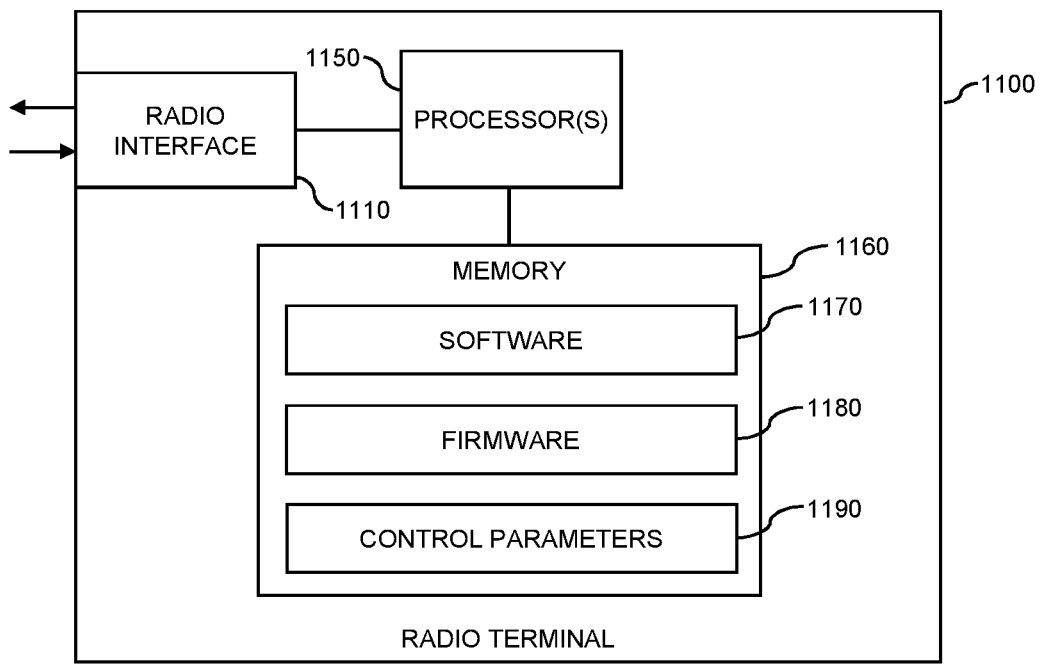
FIG. 11 schematically illustrates structures of a radio device according to an embodiment of the invention.

FIG. 11 illustrates a processor-based implementation of a radio terminal 1100 which may be used for implementing the above described concepts. For example, the structures as illustrated in FIG. 11 may be used for implementing the above-mentioned UEs 10, 11.

As illustrated, the radio terminal 1100 may include a radio interface 1110 for communicating with other radio devices, e.g., an access node, such as the above-mentioned access nodes 100, 101, or another radio terminal, such as the above-mentioned UEs 10, 11. The radio interface 1110 may support BFD communication and may thus be utilized simultaneous reception and transmission on the same carrier frequency. The radio interface 1110 may be used for sending radio transmissions and for receiving the above-mentioned reception usage indications. The radio interface 1110 may also be used for receiving radio transmissions and for sending the above-mentioned reception usage indications. The radio interface 1110 may for example be based on an LTE radio technology or on a WLAN radio technology.

Further, the radio device 1100 may include one or more processors 1150 coupled to the radio interface 1110 and a memory 1160 coupled to the processor(s) 1150. By way of example, the radio interface 1110, the processor(s) 1150, and the memory 1160 could be coupled by one or more internal bus systems of the radio device 1100. The memory 1160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1170, firmware 1180, and/or control parameters 1190. The memory 1160 may include suitably configured program code to be executed by the processor(s) 1150 so as to implement the above-described functionalities of a radio device, such as explained in connection with FIG. 7 or 9.

It is to be understood that the structures as illustrated in FIG. 11 are merely schematic and that the radio device 1100 may actually include further components which, for the sake of clarity, have not been illustrated, e.g., further interfaces or processors. Also, it is to be understood that the memory 1160 may include further program code for implementing known functionalities of a radio terminal, e.g., known functionalities of a UE. According to some embodiments, also a computer program may be provided for implementing functionalities of the radio terminal 1100, e.g., in the form of a physical medium storing the program code and/or other data to be stored in the memory 1160 or by making the program code available for download or by streaming.

Figure 12:
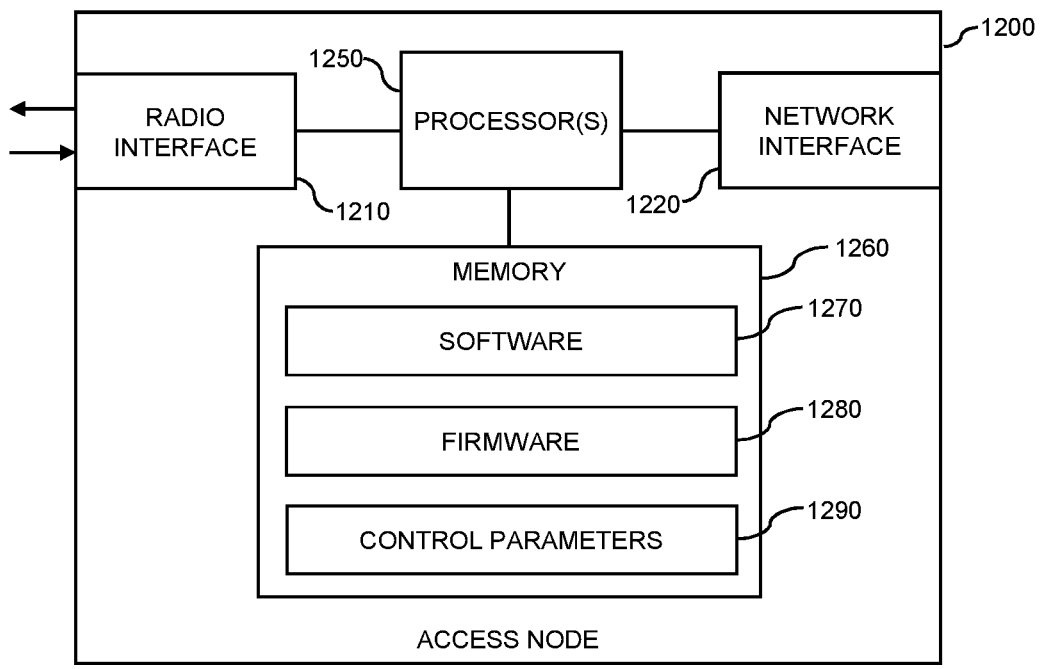
FIG. 12 schematically illustrates structures of an access node according to an embodiment of the invention.

FIG. 12 illustrates a processor-based implementation of an access node 1200 which may be used for implementing the above described concepts. For example, the structures as illustrated in FIG. 12 may be used for implementing the above-mentioned access nodes 100, 101.

As illustrated, the access node 1200 may include a radio interface 1210 for communicating with other radio devices, e.g., a radio terminal, such as the above-mentioned UEs 10, 11. The radio interface 1210 may support BFD communication and may thus be utilized simultaneous reception and transmission on the same carrier frequency. The radio interface 1210 may be used for receiving radio transmissions and for sending the above-mentioned reception usage indications. The radio interface 1210 may also be used for sending radio transmissions and for receiving the above-mentioned reception usage indications. The radio interface 1210 may for example be based on an LTE radio technology or on a WLAN radio technology. Further, the access node 1200 may include a network interface 1220 for communicating with other nodes of a wireless communication network, e.g., other access nodes or core network nodes.

Further, the access node 1200 may include one or more processors 1250 coupled to the interfaces 1210, 1220 and a memory 1260 coupled to the processor(s) 1250. By way of example, the interfaces 1210, 1220, the processor(s) 1250, and the memory 1260 could be coupled by one or more internal bus systems of the access node 1200. The memory 1260 may include a ROM, e.g., a flash ROM, a RAM, e.g., a DRAM or SRAM, a mass storage, e.g., a hard disk or solid state disk, or the like. As illustrated, the memory 1260 may include software 1270, firmware 1280, and/or control parameters 1290. The memory 1260 may include suitably configured program code to be executed by the processor(s) 1250 so as to implement the above-described functionalities of an access node, such as explained in connection with FIG. 7 or 9.

It is to be understood that the structures as illustrated in FIG. 12 are merely schematic and that the access node 1200 may actually include further components which, for the sake of clarity, have not been illustrated, e.g., further interfaces or processors. Also, it is to be understood that the memory 1260 may include further program code for implementing known functionalities of a access node. According to some embodiments, also a computer program may be provided for implementing functionalities of the access node 1200, e.g., in the form of a physical medium storing the program code and/or other data to be stored in the memory 1260 or by making the program code available for download or by streaming.

As can be seen, the concepts as described above may be used for efficiently controlling radio transmissions on a carrier frequency shared by multiple radio devices. In particular, the concepts may allow for improved collision avoidance in hidden node scenarios and thereby reduced delays. Further, the concepts may allow for more efficient usage of available carrier frequencies in exposed node scenarios.

It is to be understood that the examples and embodiments as explained above are merely illustrative and susceptible to various modifications. For example, the illustrated concepts may be applied in connection with various kinds of wireless communication technologies, without limitation to the above-mentioned examples of LTE, LTE LAA, or WLAN. Further, the concepts could also be implemented without using BFD communication capabilities. For example, the reception usage indication could be transmitted on other radio resources than a currently received radio transmission, e.g., on another carrier frequency. Further, the illustrated concepts may be applied in various kinds of radio devices, including mobile phones, portable computing devices, machine type communication devices, base stations, and relay stations. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method of controlling radio transmission in a wireless communication network, the method comprising:
   a radio device receiving a radio transmission on a carrier frequency; and
   while receiving the radio transmission, the radio device simultaneously transmitting, on the carrier frequency, an indication that the carrier frequency is currently in use by the radio transmission to the radio device.

2. The method according to claim 1, wherein the indication further indicates at least one of the following:
   radio resources which are available for a radio transmission to the radio device;
   an identity of the radio device;
   the carrier frequency.

3. The method according to claim 1, comprising:
   while not receiving any radio transmission on the carrier frequency, the radio device transmitting a further indication that the carrier frequency is not used by a radio transmission to the radio device.

4. The method according to claim 3,
   wherein the radio device transmits the further indication in a broadcast radio transmission.

5. The method according to claim 1,
   wherein the radio device is an access node of the wireless communication network.

6. A radio device comprising one or more processors and a memory, said memory containing instructions executable by said one or more processors whereby said the radio device (being configured to:
   receive a radio transmission on a carrier frequency; and
   while receiving the radio transmission, simultaneously transmit an indication on the carrier frequency that the carrier frequency is currently in use by a radio transmission to the radio device.

7. The radio device according to claim 6,
   wherein the indication further indicates at least one of the following:
   radio resources which are available for a radio transmission to the radio device;
   an identity of the radio device;
   the carrier frequency.

8. A system, comprising:
   a first radio device and at least one second radio device, the first radio device being configured to:
   receive a radio transmission on a carrier frequency; and
   while receiving the radio transmission, simultaneously transmit an indication, on the carrier frequency, that the carrier frequency is currently in use by the radio transmission to the radio device,
   the at least one second radio device being configured to:
   receive the indication from the first radio device; and
   control performing of a radio transmission to the further radio device depending on the received indication.

9. A computer program comprising program code to be executed by at least one processor of a radio device, wherein execution of the program code causes the radio device to perform the steps of a method according claim 1.

10. A computer program product comprising program code to be executed by at least one processor of a radio device, wherein execution of the program code causes the radio device to perform the steps of a method according to claim 1.

* * * * *